United States Patent Office 3,835,060
Patented Sept. 10, 1974

---

3,835,060
DEMULSIFICATION COMPOSITIONS CONTAINING ALKYL ETHER SULFATES
Jim Maddox, Jr., Margaret J. Zimmerman, and Ray Tuggle, Houston, Tex., assignors to Texaco Inc., New York, N.Y.
Filed Aug. 21, 1972, Ser. No. 282,201
Int. Cl. B01d 17/04
U.S. Cl. 252—332
9 Claims

ABSTRACT OF THE DISCLOSURE

Oil and water emulsions may be broken faster and more effectively by using a combination of certain alkyl ether sulfates and conventional demulsifiers than with either of the above types of compounds alone.

BACKGROUND OF THE INVENTION

Figure 1:
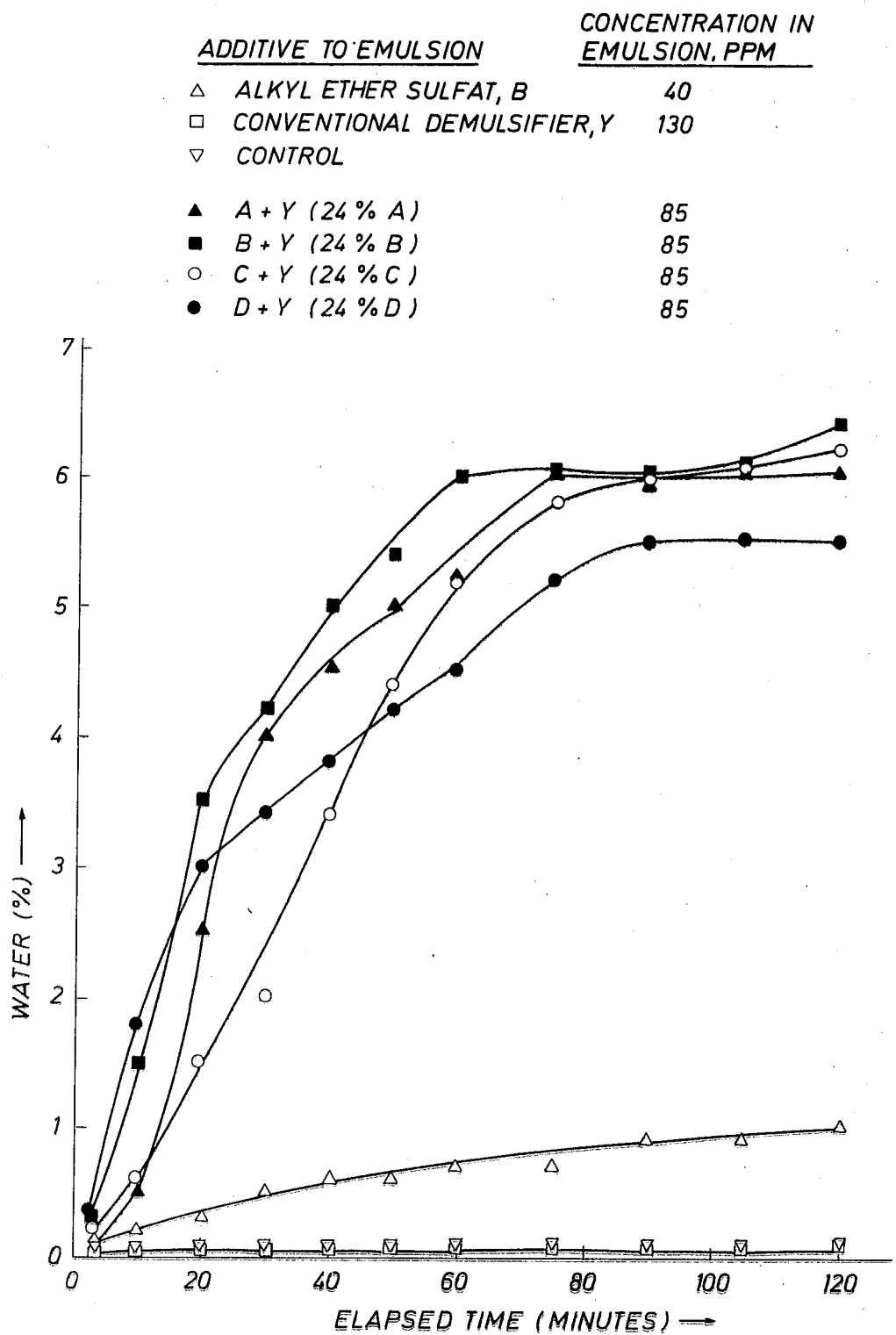

This invention pertains to the field of demulsification by chemical addition.

The petroleum industry is constantly faced with the problems of recovering oil from subterranean reservoirs where the oil is present with copious amounts of water. (The term water, as used in this application, also includes mineral ladened waters such as brine.) As the oil and water are produced through the formations and via wells to the surface, the fluids must pass through the narrow pores in the rock which characterize most petroleum reservoirs. After reaching the well, the oil and water are subjected to agitation by pumps and other production equipment. The result is that by the time the oil reaches the surface it is in the form of an emulsion with water. This presents at least two problems. First, the oil must be separated from the water in order to be marketed. Second, the water must be relatively free of oil before it can be used or disposed of. If the water is to be disposed of at or near the surface, any entrained oil causes pollution problems. Where the water is to be injected into deep reservoirs for disposal or in conjunction with secondary recovery or pressure maintenance projects, the presence of entrained oil hampers the injection of the water. Perhaps 25 percent of the oil recovered in the United States is in emulsion form. Therefore, many techniques have heretofore been employed in an attempt to recover the oil from these produced emulsions. The art is replete with ways of separating the oil and water or, as is commonly known, breaking the emulsion. The general techniques of breaking emulsions include settling, heating, electrical dehydration, centrifuging, filtration and chemical treatment.

The proposed invention is a chemical treatment which involves using a combination of chemical ingredients which exhibit demulsification properties superior to either ingredient used alone.

Conventional demulsifiers are surface active agents. Heretofore, they have been used alone or in combination with other conventional demulsifiers to break emulsions of petroleum and water in the oil field. Often the conventional demulsifiers are used in conjunction with heat treatment to break the emulsions. They are added to the produced emulsion which may then be subjected to heat or allowed to remain at ambient temperature as the emulsion is being broken. After the emulsion is broken and the water and oil have separated into distinct phases, the oil and water are individually extracted. Conventional demulsifiers are known to those skilled in the art and include, for example: oxyalkylated phenolic resins, oyalkylated glycol esters, oxyalkylated polyols, polyoxyalkylene glycols and block polymers of polyoxyethylene-polyoxypropylene. Other commonly used conventional demulsifiers include sulfonates and oxyalkylated amines.

SUMMARY OF THE INVENTION

The invention is a process for breaking an emulsion of liquid petroleum and water, using a composition comprising a combination of one or more conventional demulsifiers and salts of alkyl ether sulfates of the formula $$RO(C_2H_4O)_nSO_3M,$$

where
R=alkyl,
n=1–10, and
M=alkali metal, ammonium, alkaline earth metal or magnesium.

This invention is also the composition used to break the emulsion.

DESCRIPTION OF THE PREFERRED EMBODIMENTS

The process of this invention may be practiced using conventional emulsion breaking apparatus. The invention involves the use of new emulsion breaking compositions but requires no new equipment for its success.

The composition of this invention has at least two components which impart unique synergistic properties to the emulsion breaking capacity of the mixture. One component of the composition of this invention is a group of compounds broadly characterized as salts of alkyl ether sulfates.

The salts of alkyl ether sulfates useful in this invention include, for example, compounds of the formula:

$$RO(C_2H_4O)_nSO_3M$$

and $$RO(C_3H_6O)_nSO_3M$$

where
R=alkyl,
n=integer from 1–10, and
M=alkali metal, ammonium or alkaline earth metal or magnesium.

More specifically the salts of alkyl ether sulfates useful in this invention include, for example, compounds of the formula:

$$RO(C_2H_4O)_nSO_3M$$

and $$RO(C_3H_6O)_nSO_3M$$

where
R=alkyl from $C_{10}$–$C_{18}$,
n=1–5 and
M=alkali metal, ammonium or alkaline earth metal or magnesium.

In the most preferred embodiment of this invention, the salts of alkyl ether sulfates have the formula:

$$RO(C_2H_4O)_nSO_3M,$$

where
R=$C_{10}$–$C_{18}$,
n=1–5, and
M=alkali metal, ammonium, alkaline earth metal or magnesium.

The alkali metals in the above formula include lithium, sodium, potassium, rubidium, cesium and francium. In particular, sodium and potassium are preferred. The alkaline earth metals include calcium, barium and strontium. In particular, calcium and barium are preferred.

The salts of alkyl ether sulfates useful in this invention may be single compounds or mixtures of two or more salts of alkyl ether sulfates.

The second essential ingredient in the demulsifier composition of this invention is one or more conventional demulsifiers which have heretofore been used alone or in admixture with other conventional demulsifiers to break oil and water emulsions. The particular classes of conventional demulsifiers useful in this invention include surface active compounds, for example, oxyalkylated phenolic resins, oxyalkylated glycol esters, oxyalkylated polyols, polyoxyalkylene glycols, block polymers of polyoxyethylene-polyoxypropylene, alkyl and aromatic sulfonates, oxyalkylated amines and esters formed from short chain dicarboxylic acids and high molecular weight polyols. Although they may be used in pure form these conventional demulsifiers are usually diluted with a solvent. The solvent normally comprises 50 to 75 percent by weight of the mixture. Suitable solvents include aromatics such as xylene, toluene, and napthas. Suitable solvents also include alcohols and ketones. Other suitable materials will occur to those skilled in the art without departing from the spirit and scope of this invention.

The composition of the invention should comprise the salt of an alkyl ether sulfate in an amount ranging from about 5 to about 75% by weight and a conventional demulsifier in an amount from about 25 to 95% by weight.

The amount of the composition of this invention to be added to a given emulsion is largely dependent on the type of oil and water emulsion to be broken. Also, the nature of the oil and water as well as outside influences such as temperature will also vary the required amount of the composition of the invention. In general, however, amounts of from about one part per million (p.p.m.) to about 1000 p.p.m. of the composition of the invention in the emulsion to be broken are useful. It is especially preferred to use from about 5 p.p.m. to about 100 p.p.m. It is within the capabilities of one skilled in the art to adjust the concentration for a particular situation.

The composition of the invention may be used in the same manner as a conventional demulsifier. The methods of using demulsifiers are within the knowledge of those skilled in the art.

Experimental

The following experiments demonstrate the advantage of compositions of this invention over conventional demulsifiers used alone or salts of alkyl ether sulfates used alone.

The active ingredients in the components will be designated as shown below to simplify the presentation of the data. The components may be used as solutions in inert solvents to simplify handling.

SALTS OF ALKYL ETHER SULFATES

| Composition | Designation in data | Product designation and source |
|---|---|---|
| Sodium lauryl ether (2 E.O.) sulfate. | A | Avirol® 100-E Standard Chemical Products, Inc., Hoboken, N.J. |
| Sodium lauryl ether (3 E.O.) sulfate. | B | Retzolate® 60 Retzloff Chemical Co., Houston, Texas. |
| n-Alkyl polyether sulfate, ammonium salt. | C | Avirol® BOD-253 Standard Chemical Products, Inc., Hoboken, N.J. |
| Sodium tridecyl ether sulfate. | D | Sypex® EST-60 Alcoholac Chemical Corp., Baltimore, Md. |

CONVENTIONAL DEMULSIFIERS

| Composition | Designation in data | Product designation and source |
|---|---|---|
| Ester formed from a short chain dicarboxylic acid and a high molecular weight polyol. | X | DGE-128-A Retzloff Chemical Co., Houston, Texas |
| A mixture of sulfonates, low molecular weight oxyalkylated resins and oxyalkylated amines. | Y | TRET-O-LITE RP-2327 Petrolite Corp., St. Louis, Mo. |

Example 1

In a field trial on an oil field emulsion of produced oil and water the following results were obtained. A conventional demulsifier (Y) of proprietary formulation but known to include principally sulfonates, low molecular weight oxyalkylated resins and oxyalkylated amines was used to break the emulsion, and results were compared with a combination of the conventional demulsifier above and a salt of an alkyl ether sulfate (B) of the formula:

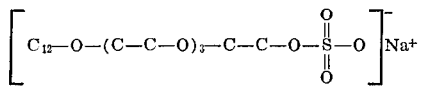

diluted with a heavy aromatic naptha and isopropanol.

| Treating chemical | Treating rate, p.p.m. | Oil in effluent water, p.p.m. |
|---|---|---|
| Y | 7.8 | 568 |
| Y plus B, 24% B | 5.16 | 99 |

As is evident from the above results the composition of this invention (Y plus B) gave results far superior to the conventional demulsifier alone.

Example 2

The attached FIG. 1 is a graphical representation which shows the synergistic effect of the composition of this invention over its individual components. When a salt of an alkyl ether sulfate or the conventional demulsifier was used in an attempt to break a water-in-oil emulsion, very little effect was noted. However, when the conventional demulsifier was blended with the salts of any of the four alkyl ether sulfates, a dramatic increase in the rate of free water separation occurred, indicating a rapid breaking of the emulsion.

Example 3

Figure 2:
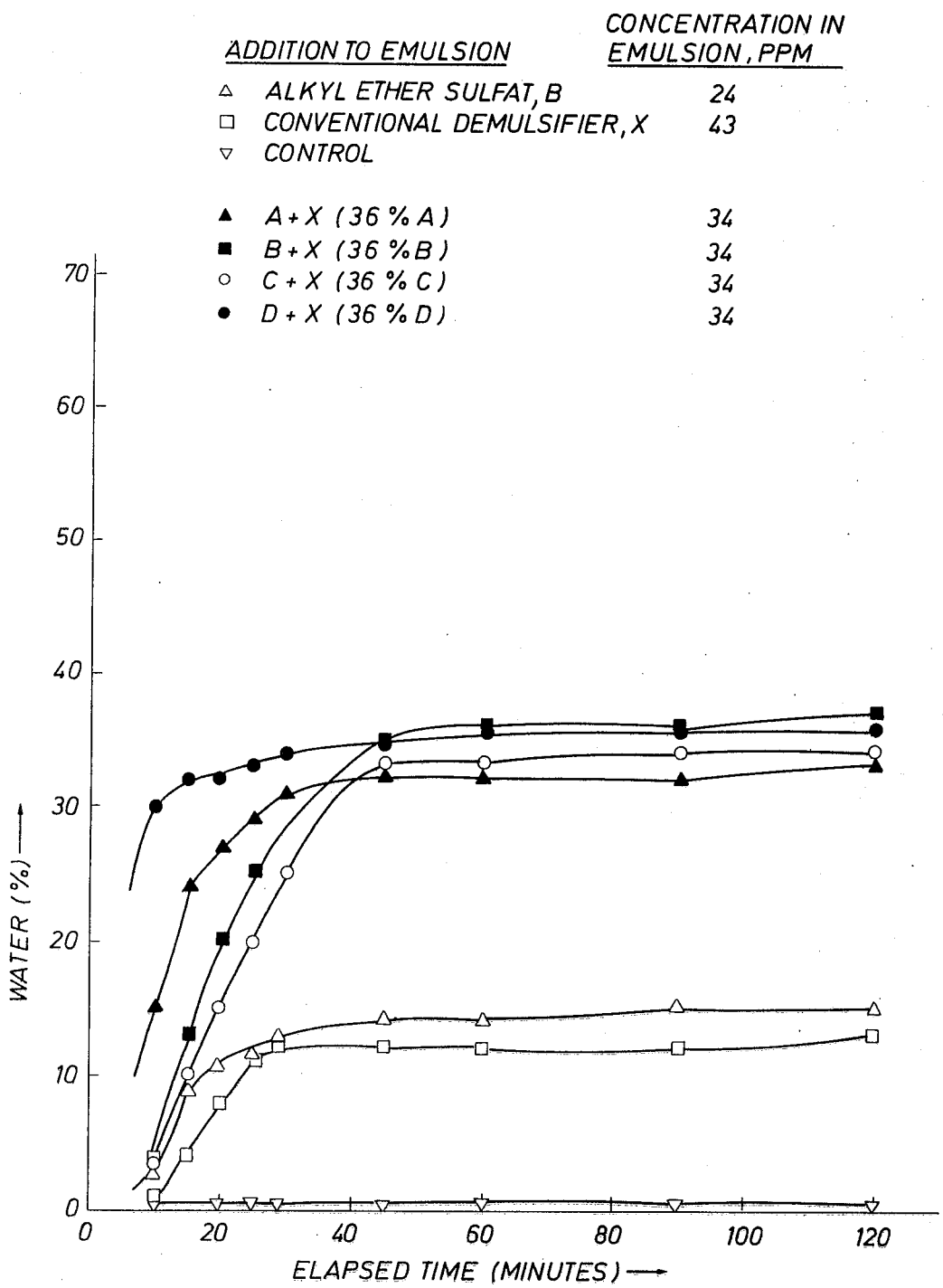

This example, as exemplified by FIG. 2, is substantially the same as Example 2, except that a different conventional demulsifier was used. The results once again show the synergistic effect of using a salt of an alkyl ether sulfate of this invention with a conventional demulsifier, as opposed to using either alone.

What is claimed is:

1. A process for breaking an emulsion of liquid petroleum and water which comprises
treating the emulsion with a mixture of a salt of an alkyl ether sulfate and one or more demulsifiers selected from the group consisting of oxyalkylated phenolic resins, oxyalkylated glycol esters, oxyalkylated polyols, polyoxyalkylene glycols, block polymers of polyoxyethylene-polyoxypropylene, alkyl and aromatic sulfonates, oxyalkylated amines and esters formed from short chain dicarboxylic acids and high molecular weight polyols.

2. A process of Claim 1 wherein the salt of the alkyl ether sulfate comprises compounds of the formula:

$$RO(C_2H_4O)_nSO_3M,$$

where
$R = C_{10}-C_{18}$,
$n = 1-5$, and
M = alkali metal, ammonium, alkaline earth metal or magnesium.

3. A process of Claim 2 wherein the alkyl ether sulfate comprises about 5 to 75 weight percent of the mixture.

4. A composition for breaking an emulsion of liquid petroleum and water consisting of
a salt of an alkyl ether sulfate having the formula $$RO(C_2H_4O)_nSO_3M$$

and $$RO(C_3H_6O)_nSO_3M$$

where
R = alkyl,
$n$ = integer from 1–10, and
M = alkali metal, ammonium or alkaline earth metal or magnesium, and a conventional demulsifier selected from the group consisting of oxyalkylated phenolic resins, oxyalkylated glycol esters, oxyalkylated polyols, polyoxyalkylated glycols, block polymers of polyoxyethylene-polyoxypropylene, alkyl and aromatic sulfonates, oxyalkylated amines and esters formed from short chain dicarboxylic acids and high molecular weight polyols wherein the salt of the alkyl ester sulfate is present in an amount ranging from about 5 to about 75 weight percent of the composition and the conventional demulsifier is present in an amount ranging from about 25 to 95 weight percent of the composition.

5. A composition as in Claim 4 wherein the salt of the alkyl ether sulfate comprises compounds of the formula:

$$RO(C_2H_4O)_nSO_3M,$$

where
- $R = C_{10}-C_{18}$,
- $n = 1-5$, and
- $M =$ alkali metal, ammonium, alkaline earth metal or magnesium.

6. A composition as in Claim 5 wherein the alkyl ether sulfate comprises about 5 to about 50 weight percent of the composition.

7. A process for breaking an emulsion of liquid petroleum and water which comprises
treating the emulsion with a mixture of a salt of an alkyl ether sulfate of the formula:

$$RO(C_2H_4O)_nSO_3M$$

and $$RO(C_3H_6O)_nSO_3M$$

where
- $R =$ alkyl,
- $n =$ integer from 1–10, and
- $M =$ alkali metal, ammonium or alkyline earth metal or magnesium, and a conventional demulsifier selected from the group consisting of oxyalkylated phenolic resins, oxyalkylated glycol esters, oxyalkylated polyols, polyoxyalkylene glycols, block polymers of polyoxyethylene-polyoxypropylene, alkyl and aromatic sulfonates, oxyalkylated amines and esters formed from short chain dicarboxylic acids and high molecular weight polyols.

8. A process as in Claim 7 wherein the alkyl ether sulfate has the formula:

$$RO(C_2H_4O)_nSO_3M,$$

where
- $R =$ alkyl chain having from 10 to 18 carbon atoms,
- $n = 1$ to 5, and
- $M =$ alkali metal, ammonium, alkaline earth metal or magnesium.

9. A process as in Claim 8 wherein R is lauryl.

References Cited

UNITED STATES PATENTS

| | | | |
|---|---|---|---|
| 2,110,847 | 3/1938 | De Groote | 252—332 |
| 2,454,543 | 11/1948 | Bock | 252—332 |

JOHN D. WELSH, Primary Examiner

U.S. Cl. X.R.

252—358